(12) United States Patent
Ratliff

(10) Patent No.: US 7,380,549 B1
(45) Date of Patent: Jun. 3, 2008

(54) SOLAR ENERGY CONCENTRATOR FOR POWER PLANTS

(76) Inventor: George D. Ratliff, 2314 Forest Dr., Pittsburgh, PA (US) 15235-1896

( * ) Notice: Subject to any disclaimer, the term of this patent is extended or adjusted under 35 U.S.C. 154(b) by 183 days.

(21) Appl. No.: 11/506,506

(22) Filed: Aug. 21, 2006

(51) Int. Cl.
*F24J 2/38* (2006.01)

(52) U.S. Cl. .................. 126/605; 126/600; 126/680; 126/685

(58) Field of Classification Search ........... 126/605, 126/606, 607, 600, 680, 684, 685
See application file for complete search history.

(56) References Cited

U.S. PATENT DOCUMENTS 4,466,423 A * 8/1984 Dolan et al. ............. 126/571
5,787,878 A * 8/1998 Ratliff, Jr. ............. 126/680

* cited by examiner

*Primary Examiner*—Alfred Basichas
(74) *Attorney, Agent, or Firm*—Glenn E. Klepac

(57) ABSTRACT

A solar concentrator includes a mirror 24 having a frame 27 connected with a lever 55, a train 36 supporting the frame 27 and the lever 55, a first control cable 28 connected with the frame 27, and a second control cable 30 connected with the lever 55. A first locomotive 35 moves the train along a curvilinear path to keep the mirror 24 opposite the sun. The first control cable 28 controls pitch of the mirror 24 and the second control cable 30 controls yaw of the mirror 24. When a concentrator includes a plurality of mirrors 24 they are preferably controlled collectively by pulling all of the first control cables 28 with one motor to control pitch and by pulling all of the second control cables 30 with one motor to control yaw. Sunlight focused on the receiver 20 preferably boils water to form steam that is transmitted to a turbine connected to a generator for producing electricity.

24 Claims, 6 Drawing Sheets

SOLAR ENERGY CONCENTRATOR FOR POWER PLANTS

BACKGROUND

1. Field of the Invention

This invention relates to a concentrator for focusing sunlight onto a central receiver by means of mirrors revolving around the receiver. Central-receiver concentrators can be used to produce the high-pressure steam needed in power plants.

2. Discussion of the Prior Art

Sunlight can replace coal, natural gas, or uranium as the source of energy for electric power plants. Sunlight must be collected and concentrated to obtain the high temperature needed for producing high-pressure steam used in power plants. Several high-pressure steam solar power plants were built in the 1970's and early 1980's. They proved to be much too expensive and inefficient for widespread commercial use.

The high cost and poor performance of the plants was attributed to the heliostats used as solar concentrators. Heliostats include massive steel and concrete pedestals supporting mirrors that rotate about 2 axes to keep sunlight focused on a central receiver. Mirrors mounted on pedestals are inherently expensive and inefficient. Each heliostat requires 2 sets of precise hinges, motors, and gearboxes to rotate the mirrors about 2 axes. The mirrors cannot rotate about the receiver to keep facing the sun, or move out of shadows of other mirrors, or move out of storms. When these earlier plants were built there were no suitable mobile-mirror solar concentrators.

Solar energy concentrators focusing sunlight onto a central receiver by means of mirrors revolving around a central receiver are known in my U.S. Pat. No. 5,787,878 which shows a mobile-mirror solar energy concentrator with mirrors rotated by hydraulic pistons linked with hydraulic hoses to a few motors and pumps on each train. The trains are braced against wind with cables anchored to moving trains. When storms threaten, the cables are reeled in with rack and pinion drives as the trains move to closely-spaced tracks where the trains are nested compactly and enclosed by roof panels attached to the mirrors. One disadvantage is the cost of the large number of pistons, hoses, cable reels, and rack and pinion drives required. Another disadvantage is the amount of land and track required. Still another disadvantage is the weight and complexity of roof panels attached to the mirrors.

OBJECTS OF THE INVENTION

One object of this invention is to reduce the cost of a solar energy concentrator by eliminating the pumps, pistons, hoses, cable reels, rack and pinion drives, and most of the motors. Another object is to reduce the amount of land and track required. A further object is to eliminate the roof panels attached to the mirrors. An additional object is to increase the output by reducing focusing errors caused by wind pressure on the mirrors.

Other objects and advantages of my invention will become clear from the following description.

SUMMARY OF THE INVENTION

Sunlight is focused onto a central receiver with mirrors that revolve around the receiver while rotating about two axes. Trains of vehicles run on concentric tracks. The mirrors are in frames that span between two vehicles. One corner of each frame is hinged to the first vehicle and the other end is suspended by a lever that is hinged to the second vehicle. First and second cables brace each mirror frame against wind and also rotate the frame about two axes. The first cable is tethered to the frame and the second cable is tethered to the lever. Two winches pull the cables back and forth between two anchorage trains on the inner and outermost tracks. A first winch pulls all of the first cables to change the pitch of the mirror frames. The term "pitch" means rotation about a horizontal axis in the longitudinal direction of the train. A second winch pulls all of the second cables to change the yaw of the frames. "Yaw" means rotation about a vertical axis. The leverage of each lever is preset to produce the yaw needed to focus sunlight onto the receiver. The winches also move the cables to compensate for wind pressure on the mirrors. At night and when the wind is too strong, the two winches lower the frames onto low walls beside the tracks.

DETAILED DESCRIPTION OF A PREFERRED EMBODIMENT

Figure 1:
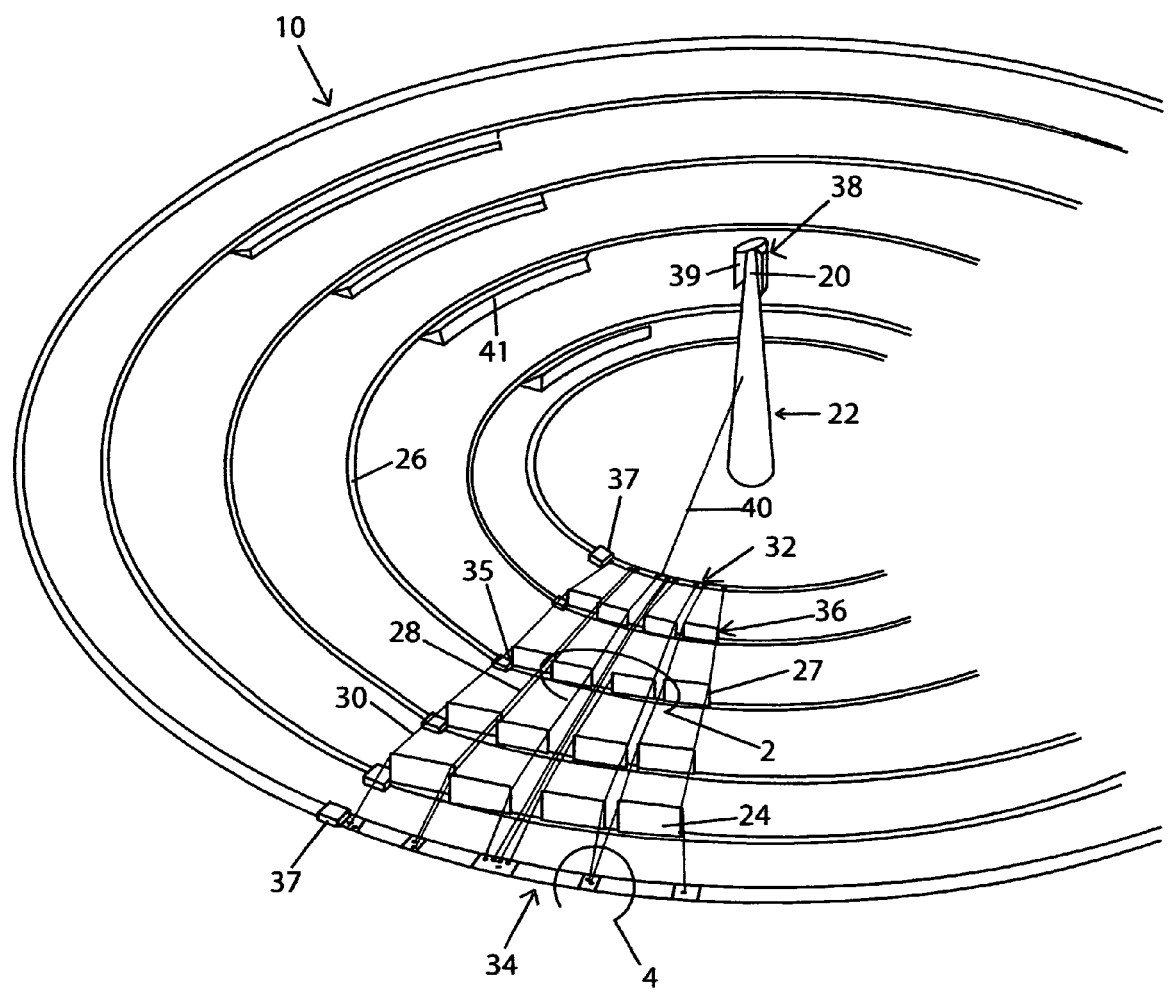
FIG. 1 is an overall view of the solar concentrator of the present invention.

FIG. 1 is an overall view of the solar concentrator 10. The concentrator includes a central receiver 20 on a tower 22 and mirrors 24 (shown from behind) that move around the tower 22 on concentric circular tracks 26. The mirrors are braced by radially extending cables 28, 30. The cables are anchored to an innermost anchorage train 32 and an outermost anchorage train 34. Mirror locomotives 35 pull the mirror-frame trains 36 and anchorage locomotives 37 pull the anchorage trains 32, 34 around the tower synchronized with azimuthal change of the sun's position. The receiver 20 has a rotating hood 38 with secondary mirrors 39 on the inside of the hood 38. An umbilical connection 40 delivers electricity and computer commands from the tower 22 to operate motors on the trains. Low walls 41 beside the tracks extend the full length of the mirror-frame trains 36 on their respective tracks 26.

Figure 2:
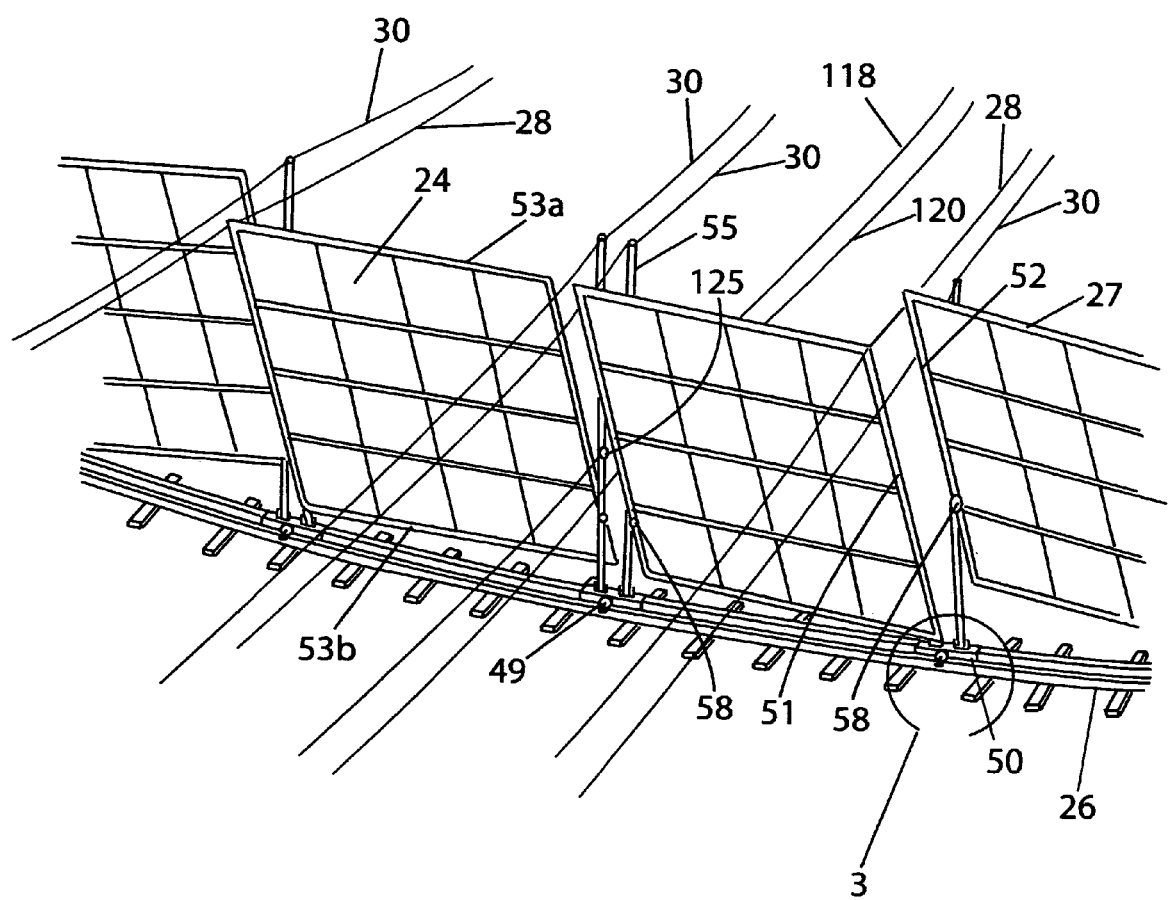
FIG. 2 is an enlarged view of a portion of FIG. 1 showing a portion of a mirror frame train and its track.

FIG. 2 is an enlarged close-up view of a portion of a mirror-frame train 36 shown in FIG. 1. The mirrors 24 are held in rigid frames 27. The frames 27 span between two vehicles 49, 50. One bottom corner of each frame 27 is hinged to one vehicle 50 and the other end of the frame 27 is suspended above the vehicle 49 by a lever 55 that is hinged to the vehicle 49. The vehicles 49, 50 are on tracks 26 and are connected to each other with links 56. Each frame 27 holds a plurality of small flat mirrors 24 supported by vertical mullions or end mullions 51, 52 connected with horizontal top and bottom mirror rails 53a, 53b. The frame members 51, 52, 53a, 53b should be rigidly connected to each other and should have high resistance to twisting as provided, for example, by tubes. The small flat mirrors are shimmed in the muntins (not numbered) extending horizontally between the mullions 51, 52 and in the vertically extending muntins (not numbered) extending between the mirror rails 53a, 53b to cause reflected sunlight from the small mirrors to converge onto the receiver 20. The frames 27 are braced with radially extending cables 28, 30. The first cables 28 are attached near a top corner of each frame, or at the top corner on a first mullion 51. Second cables 30 are attached at or near a top of each lever 55. Levers 55 support one end of each mirror frame 27 with a joint that is preferably a multi-axis hinge 58 located at various distances from the bottom of the mirror frame 27, along the second mullion 52.

Figure 3:
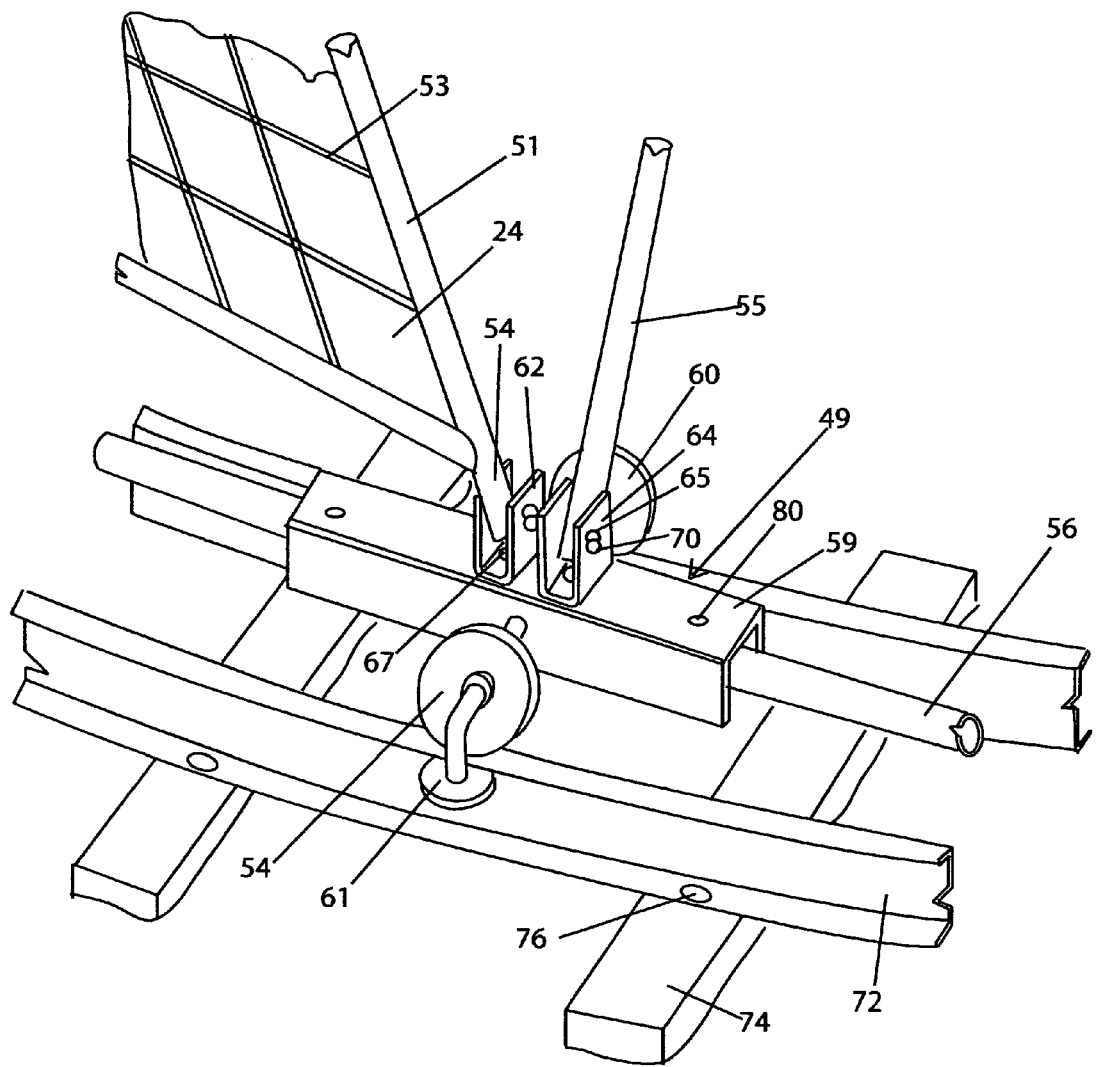
FIG. 3 is an enlarged portion of FIG. 2 showing one of the vehicles that supports one end of two mirror frames.

FIG. 3 is an enlarged close-up view of a vehicle 49 as shown in FIG. 2. The vehicle is comprised of a chassis 59, two supporting wheels 60, two guide wheels 61, a first bracket 62 engaging a lower end 54 of a first mullion 51 on the frame 27, and a second bracket 64 engaging a lower end of the lever 55. The vehicles are linked to each other with links 56 that fit within the chassis 59 and are secured with bolts 80. The brackets 62 and 64 are "U" shaped with vertically-slotted holes 65 in each upright leg and an aperture in the bottom for attaching the brackets to the chassis 59 with bolts 67. The bolts 67 are loosely secured to the chassis 59 to allow rotation of the brackets about the bolts 67. The holes 65 support axles 70 that are attached to the bottom end 54 of the frame 27 and to the levers 55. Supporting wheels 60 run on top of channel rails 72 that are bolted to rail ties 74 with rail tie bolts 76. Guide wheels 61 roll against the inside webs of the channel rails 72.

Figure 4:
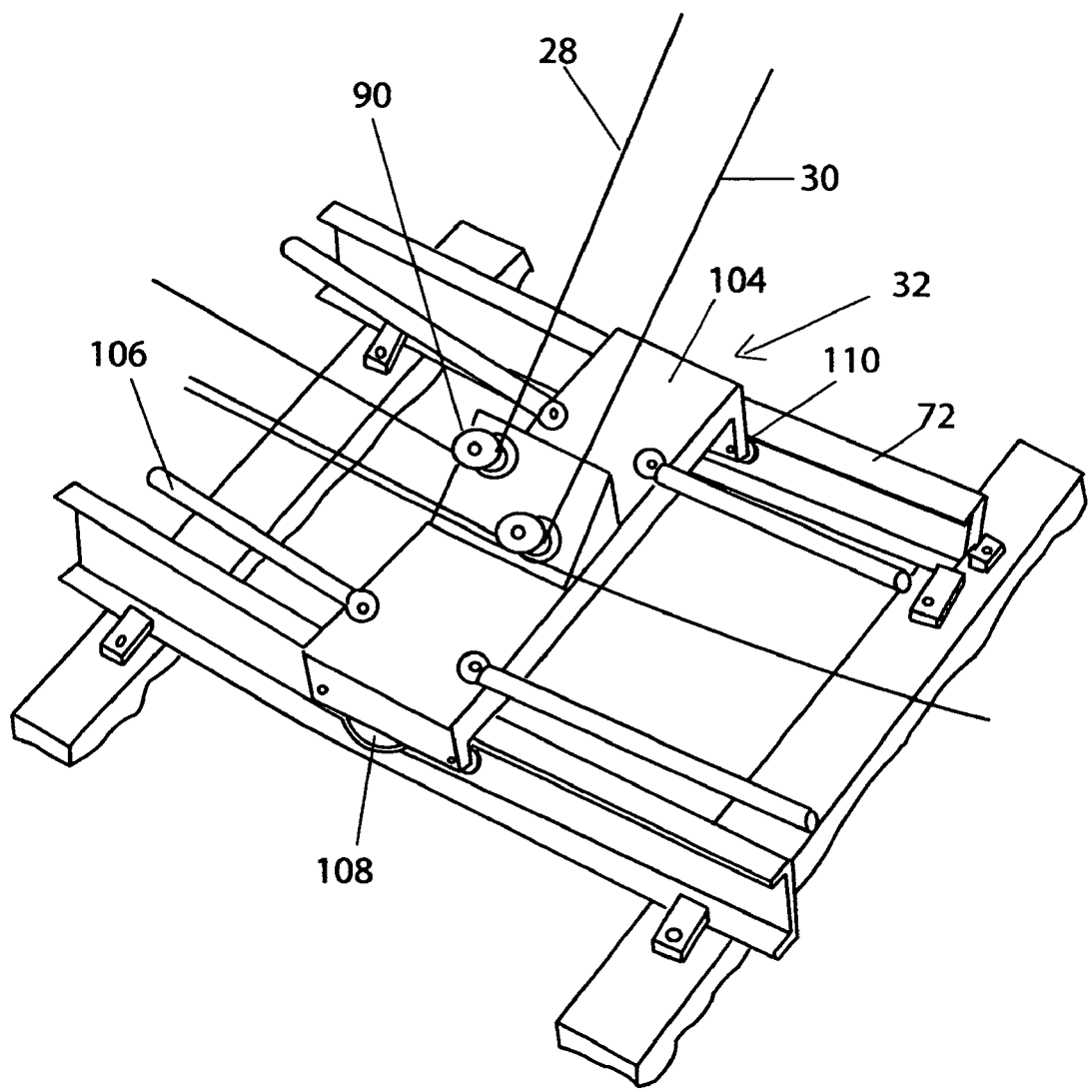
FIG. 4 is an enlarged view of a portion of FIG. 1 showing a portion of an anchorage train.

FIG. 4 is an enlarged view of a portion of FIG. 1 showing a portion of an anchorage train 32. The anchorage trains have platforms 104 and linkage bars 106 connecting the platforms 104. Horizontal wheels 108 are in rolling contact with rails 72 and vertical wheels 110 are in rolling contact with the upper flange of the rails 72. Cables 28 and 30 are redirected by pulleys 90.

Figure 5:
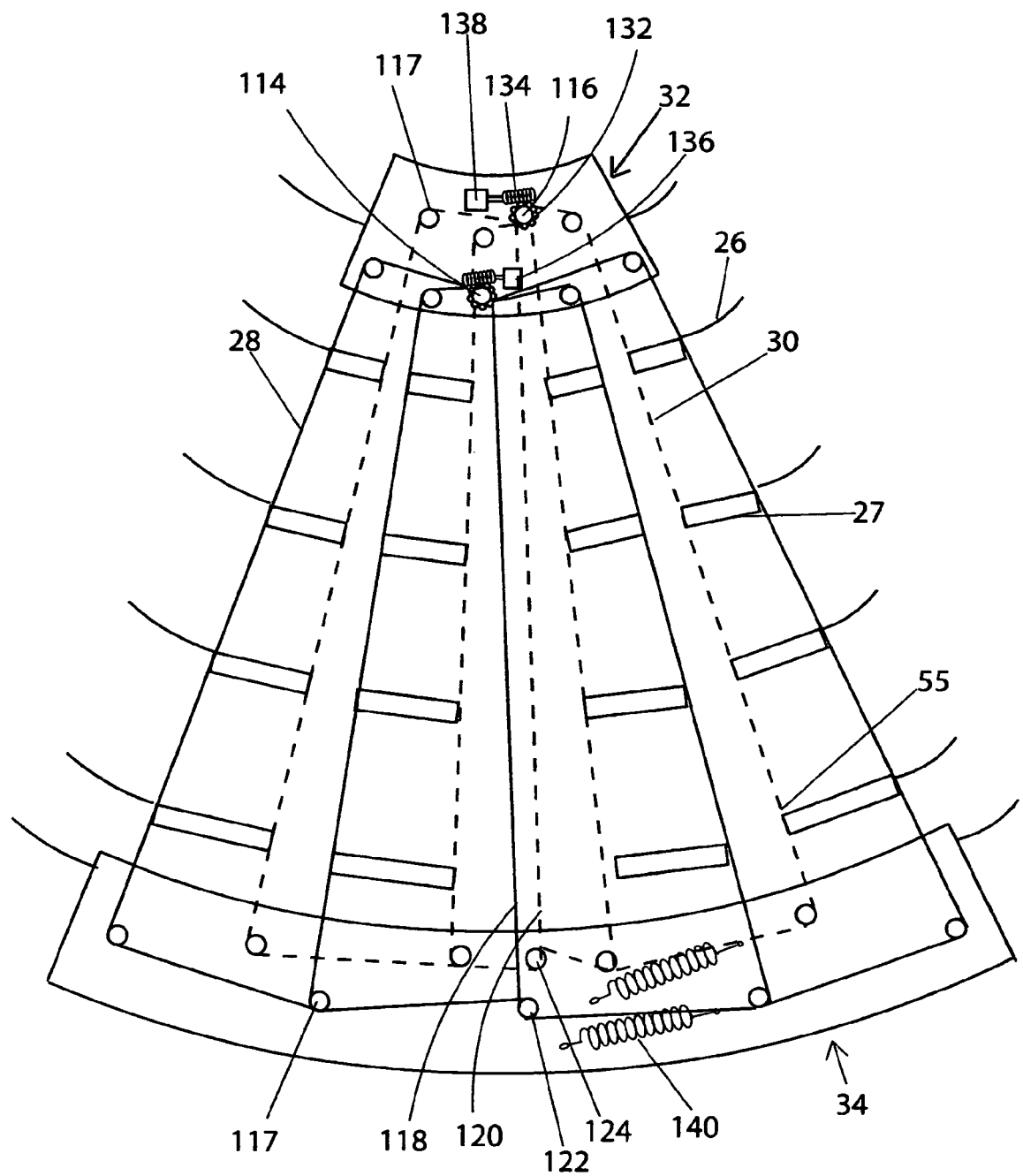
FIG. 5 is a schematic diagram of the cable riggings.

FIG. 5 is a schematic diagram of the cable riggings. All of the first cables 28 are wrapped around and attached to a first winch 114 and all of the second cables 30 (shown in dashed lines) are wrapped around and attached to a second winch 116. The guy cables are redirected toward the winches with pulleys 117. Linking cables 118 and 120 link the winches on one anchorage train to drum pulleys 122 and 124 on the other anchorage train. The linking cables are wound around and attached to the winches and drum pulley in the opposite direction of the winding of the cables 28 and 30, whereby when the winch or drum pulley reels in a cable, the linking cable is reeled out. Rollers 125 attached to two levers 55 on each train 36 support the linking cables 118 and 120. The winches have gears 132 and worm gears 134. Motors 136 and 138 turn winches 114 and 116 respectively. Biasing springs 140 on at least one of the anchorage trains pull the cables 28 and 30 away from the tower 22.

A computer housed inside the tower 22 controls all of the motors that operate the concentrator and receives data from weather stations.

Operation of the Concentrator

When the computer determines from its stored algorithms that the sun has reached a suitable altitude, and determines from weather station data that the wind is not too strong, then it has the motors 136 and 138 lift the mirror frames 27 from their stowed position on the low walls 41 to their upright position with the aid of the biasing springs 140. As the sun's position changes, the computer directs the locomotives 35, 37 to keep the middle of the trains 36 on the opposite side of the tower 22 from the sun. The receiver hood 38 also rotates to keep its opening facing the trains 36. Motors 136 and 138 pull their respective riggings to satisfy the formulas for focusing sunlight reflected from the mirrors onto the receiver 20. When the sun is too low, or the wind is too strong, the computer controls the locomotives 35 and 37 that move the trains 36 next to the low walls 41. The mirror frames 27 are then lowered by motors 136 and 138 onto the walls 41 to enclose the mirrors 24. Springs 140 counterbalance the weight of the mirrors 24 and frames 27 as they are lowered.

The correction for wind induced focusing errors is accomplished by using wind speed and direction data to calculate the forces on the mirrors and the resulting changes in the forces on the cables and the changes in the sag and strain of the cables. Corrections are made by rotating the winches 114, 116 with respective motors 136 and 138.

Theory of Operation

The formulas for the rotation of the mirrors needed to keep sunlight focused on the receiver were published in my U.S. Pat. No. 5,787,878, the disclosure of which is incorporated herein by reference to the extent consistent with the present invention. The formula for pitch shows that all of the mirrors should change pitch approximately equally as they revolve around the receiver. Those nearer the receiver are inclined more than those farther away, but the change during the day is nearly the same for all of the mirrors. Those nearer the receiver are supported on higher walls at night, and thereby start each day with greater pitch, but they change nearly the same as the others during the day. By linking the frames together with cables 28, motor 114 keeps sunlight from all of the mirrors focused at the level of the receiver. The slight differences in the change during the day can be accommodated by tethering the cables 28 at predetermined distances from the top corner of the frames.

Figure 6:
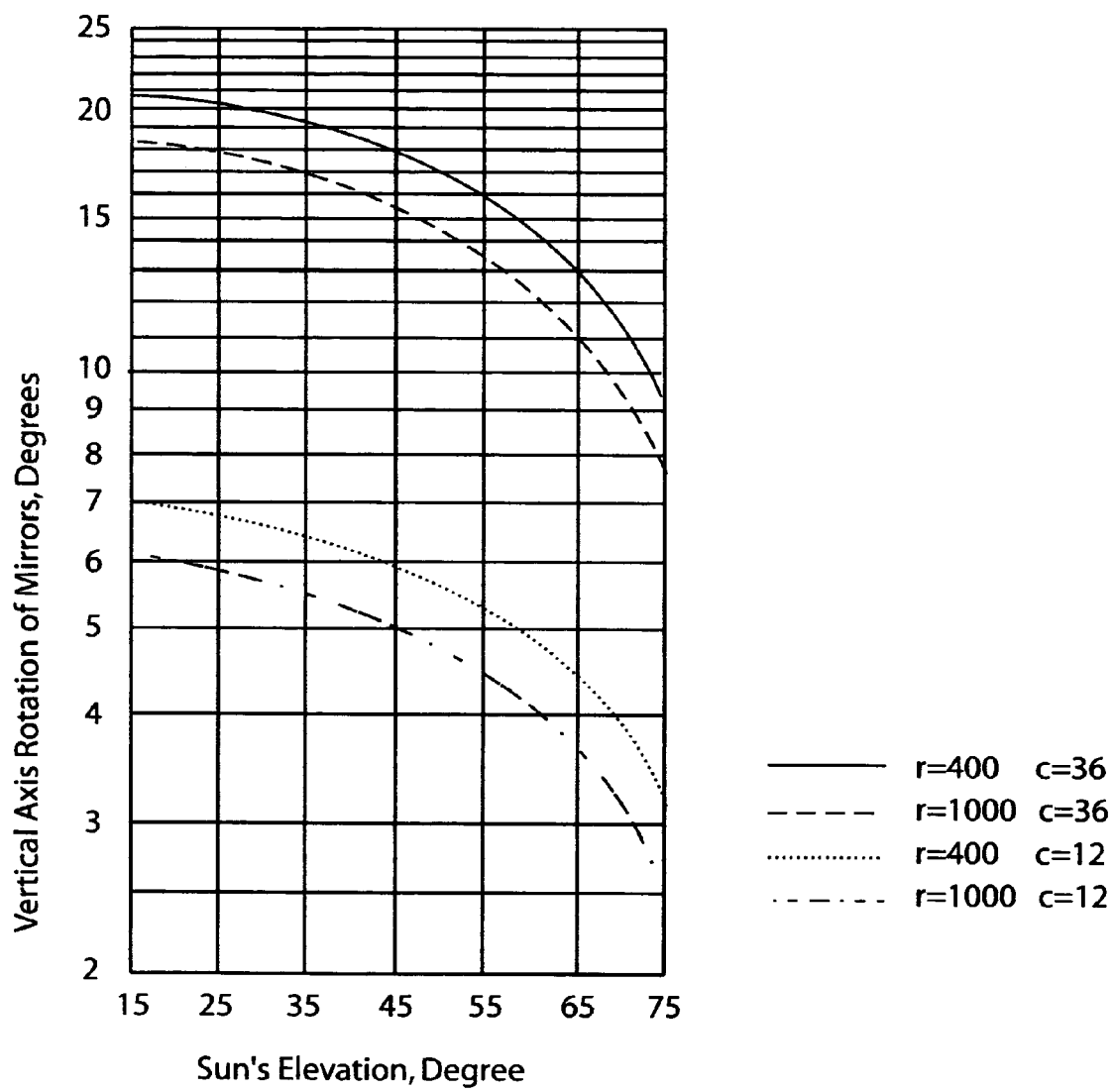
FIG. 6 is a semi-log plot of the required yaw rotation of four mirrors for various altitudes of the sun.

The formula for yaw shows that yaw changes differ considerably from frame to frame. FIG. 6 shows the required change in yaw for four mirrors in a concentrator that is much larger than the example depicted in FIG. 1. In a small concentrator, the mirror can focus sunlight without changing yaw but in a commercial size plant, yaw rotation will be necessary.

In FIG. 6 the yaw rotations are plotted on a logarithmic Y-axis and the altitudes of the sun are plotted on a linear X-axis. The four mirrors were arbitrarily selected for trains 400 and 1000 feet from the receiver on trains subtending central angles of 12 and 36 degrees of rotation from the middle of the trains. In FIG. 6 the distance from the receiver is designated "r" and the central angle as "C." The receiver is 400 feet high. This semi-log graph shows that the four rotations are not equal, but that they are nearly identical in shape. Therefore, if the values of the yaw rotation in each curve are multiplied by a constant, the curves can be shifted up or down until they are superimposed over each other and become one curve. Therefore, if mechanical devices equivalent to multiplying by constants are built into each frame, the frames can be rotated by pulling the cables equally.

The mechanical devices equivalent to multiplying by constants are the levers 55, shown in FIG. 2. The levers swing one end of each frame about its other end. The leverage of each lever depends on the location of joints 58 connecting the levers 55 with the second mullions 52, the length of the levers 55, and the length of the mirror frames 27. By presetting these three variables on each mirror frame 27 and by linking the levers with the second control cables 30, a motor 138 controls the yaw of all the frames collectively and keep sunlight from all of the mirrors focused on the receiver.

CONCLUSIONS AND SCOPE

The present invention eliminates thousands of motors, gear boxes, hydraulic pistons, hoses, and other activators required for effective operation of earlier solar concentrators. Massive supports for the mirrors or additional closely-spaced tracks are unnecessary because the mirror frames can be lowered to the ground when the wind is too strong. The effects of wind on the accuracy of focusing are ameliorated automatically by inputting weather data into a computerized control system.

The particularly preferred embodiment of the invention described above is intended as an example and not a limitation of the scope of the invention. With larger solar power plants, it may be desirable to have multiple groups of mirrors with each group rotated by two motors. Also, large plants might employ more than two anchorage trains. The hood around the receiver should be able to close when storms threaten. Although electric motors are shown, hydraulic motors are also suitable. The trains described herein are pulled by locomotives; however, one or more individual wheels on each train could be motorized instead.

PARTS LIST 10 solar concentrator
20 receiver
22 tower
24 mirror
26 tracks
27 frame
28, 30 cables
32, 34 anchorage trains
35, 37 locomotives
36 mirror frame trains
38 hood
39 secondary mirrors
40 umbilical connection
41 low walls
49, 50 vehicles
51 first mullion
52 second mullion
53a, 53b mirror rails
54 bottom end of first mullion
55 lever
56 link
57 top corner of frame
58 joint
59 chassis
60 supporting wheels
61 guide wheels
62, 64 brackets
65 hole
67 bolt
70 axle
72 channel rails
74 rail ties
76 rail tie bolts
80 bolt
90 pulley
104 platform
106 linkage bar
108 horizontal wheels
110 vertical wheels
114 first winch
116 second winch
117 pulleys
118, 120 linking cables
122, 124 drum pulleys
125 roller
132 gear
134 worm gear
136, 138 motor
140 spring

I claim:

1. A solar concentrator for focusing sunlight onto a receiver, comprising:
   (a) a mirror comprising a frame surrounding at least one reflector for reflecting sunlight onto a receiver, said frame including first and second laterally spaced mullions,
   (b) a train supporting said frame,
   (c) a first motor for revolving said train along a curvilinear path to keep the mirror and the sun on opposite sides of the receiver as the sun's position changes,
   (d) a first control cable connected with said frame, said first control cable controlling pitch of said mirror by rotating said frame about said train, and
   (e) a lever including a lower portion supported by train, an upper portion attached to a second control cable, and a joint with the second mullion between the lower and upper portions of the lever, said second control cable controlling yaw of said mirror by rotating the mirror about said train.

2. The solar concentrator of claim 1 further comprising track means for confining movement of said train to a curvilinear path.

3. The solar concentrator of claim 1 further comprising a first winch connected with said first control cable.

4. The solar concentrator of claim 3 further comprising a second winch connected with said second control cable.

5. The solar concentrator of claim 4 further comprising a computer for controlling said first motor and said first and second winches to keep the mirror on an opposite side of the receiver from the sun and to focus sunlight reflected from the mirror accurately on the receiver, all in response to changes in position of the sun.

6. The solar concentrator of claim 1 further comprising a hinge connection between said frame and said train.

7. The solar concentrator of claim 1 wherein said first and second mullions are rigid and extend generally vertically.

8. The solar concentrator of claim 1 wherein said joint between the second mullion and the lever is a multi-axis hinge.

9. The solar concentrator of claim 1 wherein said receiver contains a water/steam mixture or a heat transfer fluid.

10. The solar concentrator of claim 1 further comprising means for maintaining supportive tension on said first and second cables.

11. The solar concentrator of claim 10 wherein said means for maintaining supportive tension comprises an inner anchorage train radially inward of said train, an outer anchorage train radially outward of said train, and means for moving the first and second control cables back and forth between the inner and outer anchorage trains to keep sunlight focused upon the receiver.

12. The solar concentrator of claim 11 further comprising means for balancing reeling in of the cables on one of the anchorage trains and reeling out the cables on the other anchorage train.

13. The solar concentrator of claim 12 wherein said means for balancing reeling in and reeling out comprises at least one linkage cable connecting a winch on one of the anchorage trains with a drum pulley on the other anchorage train.

14. A process for accurately focusing sunlight onto the receiver of claim 1 comprising reflecting sunlight from said mirror onto said receiver, revolving said mirror along a curvilinear path to keep the mirror and the sun on opposite sides of the receiver, controlling pitch of the mirror with the first control cable, and controlling yaw of the mirror with the second control cable.

15. The process of claim 14 wherein a computer controls said steps of revolving, controlling pitch, and controlling yaw.

16. A process for generating electricity from sunlight comprising focusing sunlight onto the receiver of claim 1 to heat a steam/water mixture contained in the receiver, transmitting steam from the receiver to a turbine connected with a generator producing electricity.

17. A process for generating electricity from sunlight comprising focusing sunlight onto the receiver of claim 1 to heat a heat transfer fluid contained in the receiver, exchanging heat from the heat transfer fluid to a steam/water mixture, and transferring steam to a turbine connected with a generator thereby producing electricity.

18. The process of claim 1 wherein said solar concentrator includes a curved track for controlling revolving of the train around the receiver and at least one enclosure wall adjacent the track, said process further comprising lowering said frame onto said enclosure wall to enclose said mirror.

19. A solar concentrator for focusing sunlight onto a receiver, comprising:
(a) at least one generally planar mirror having a frame including a first mullion and a second mullion spaced laterally from said first mullion,
(b) a train supporting said first mullion,
(c) a first control cable connected with said frame, said first control cable controlling pitch of said mirror by rotating said mirror about said train, and
(d) a lever including a lower portion and an upper portion attached to a second control cable, said lever being connected with said frame by a joint between said lower portion and said upper portion, said second control cable controlling yaw of said mirror by rotating the frame around the train.

20. A process for generating electricity wherein sunlight is focused onto a receiver, said process comprising:
(a) providing at least one mirror with a frame comprising first and second mullions,
(b) supporting the frame on a first vehicle,
(c) controlling pitch of the mirror by rotating the mirror about the first vehicle,
(d) supporting a lever on a second vehicle, said lever including a lower portion attached to the second vehicle and an upper portion attached to a control cable, said control cable controlling yaw of the mirror by rotating it around the first vehicle,
(e) said mirror reflecting sunlight onto a receiver containing water to form steam, transmitting the steam to a turbine connected with a generator producing electricity, and
(f) revolving said mirror in a curvilinear path to keep the mirror and the sun on opposite sides of the receiver as the sun's position changes.

21. A solar concentrator for focusing sunlight onto a receiver, comprising:
(a) a plurality of generally planar mirrors each having a frame,
(b) a plurality of trains each supporting at least one frame, said trains revolving around said receiver on concentric tracks with the receiver at a center to keep the trains on an opposite side of the receiver from the sun,
(c) a plurality of first control cables attached to each of said frames and controlling pitch of the frames,
(d) a plurality of second control cables,
(e) a plurality of levers each attached to one of said frames, to one of said second control cables, and to a train, each of said levers being preset with a leverage to control yaw of the frame to which it is attached.

22. The solar concentrator of claim 21 further comprising:
(f) an enclosure wall beside each of said tracks, said enclosure walls being arranged to enclose said mirrors by having a frame tilt onto said enclosure wall.

23. The solar concentrator of claim 22 wherein each said enclosure wall has a wall height preset to establish as starting pitch needed to collectively control the pitch of said frames by pulling on said first control cables.

24. The solar concentrator of claim 22 further comprising:
(g) 2 winches, one for pulling collectively all of said first control cables and another for pulling collectively all of said second control cables.

* * * * *